April 12, 1949.
D. CANADY
2,467,253
INTERMITTENT PULLDOWN MECHANISM FOR
MOTION-PICTURE PROJECTORS
Filed Nov. 6, 1947
2 Sheets-Sheet 1
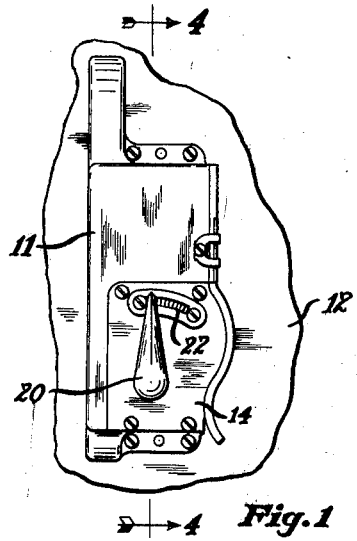
Fig.1
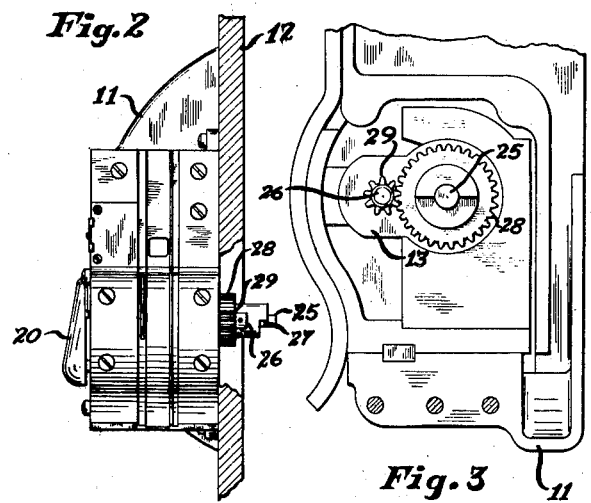
Fig.2    Fig.3
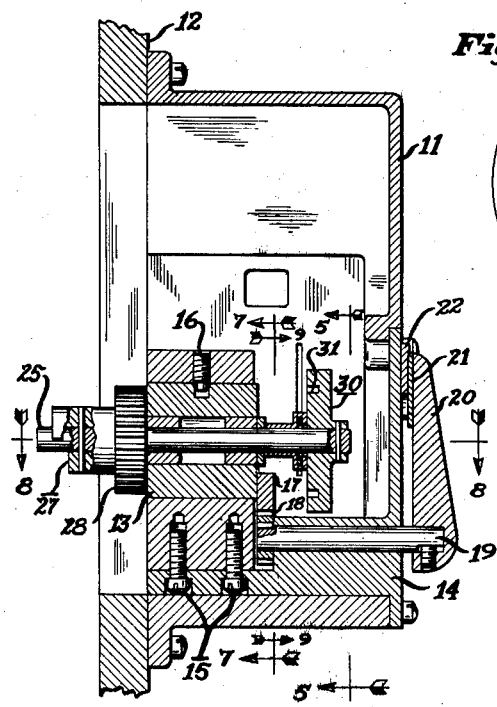
Fig.4
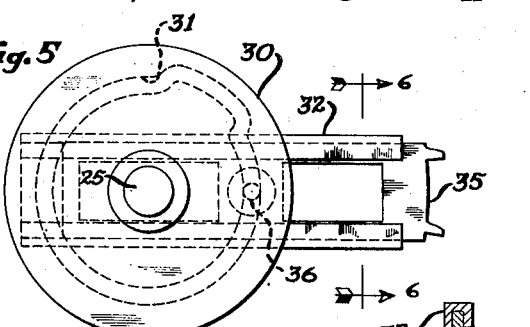
Fig.5
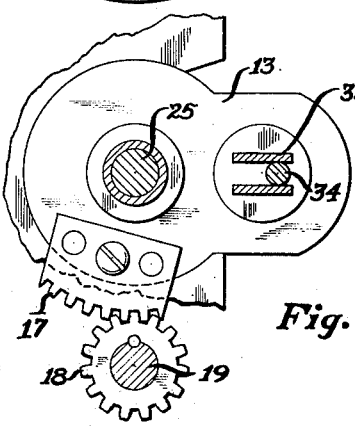
Fig.6
Fig.7
INVENTOR.
Don Canady
BY
H.C. Karl.
ATTORNEY INVENTOR.
Don Canady
BY
H.C. Karel.
ATTORNEY Patented Apr. 12, 1949

2,467,253

UNITED STATES PATENT OFFICE 2,467,253

INTERMITTENT PULLDOWN MECHANISM FOR MOTION-PICTURE PROJECTORS

Don Canady, Cincinnati, Ohio, assignor to Dayton Acme Company, Cincinnati, Ohio, a corporation of Ohio Application November 6, 1947, Serial No. 784,348

1 Claim. (Cl. 88—18.4)

This invention relates to an improved intermittent mechanism wherein an extremely fast pull down is desired as in the case of the projector being used in connection with television broadcast, to permit the maximum time for scanning the stationary picture.

The subject of my invention is to provide a simple mechanism having a high speed pull down and which can be adjusted to frame the picture.

My invention will be further readily understood from the following description and claims, and from the drawings, in which latter:

Fig. 1 is a side view of the intermittent mechanism, with the projector broken away.

Fig. 2 is an end view of the same.

Fig. 3 is a rear view of the same.

Fig. 4 is a vertical section, taken in the plane of the line 4—4 of Fig. 1.

Fig. 5 is a detail view of the claw and cam, taken in the plane of the line 5—5 of Fig. 4.

Fig. 6 is a detail section, taken in the plane of the line 6—6 of Fig. 5.

Fig. 7 is a detail section, taken in the plane of the line 7—7 of Fig. 4.

Figure 8:
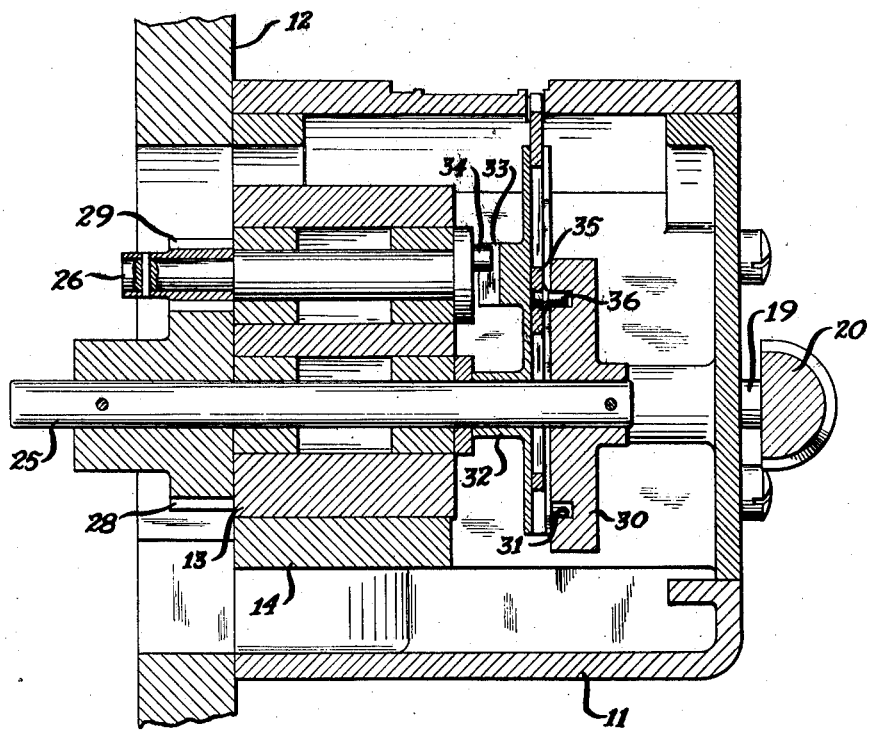
Fig. 8 is an enlarged horizontal section, taken in the plane of the line 8—8 of Fig. 4.
Figure 9:
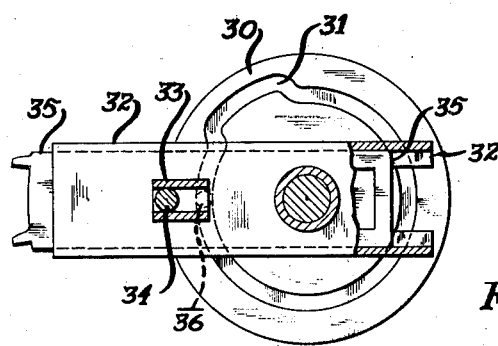
Fig. 9 is a detail section, taken in the plane of the line 9—9 of Fig. 4.

My improved intermittent mechanism comprises a housing 11 secured to the frame 12 of the projector. Mounted within the housing is a carrier 13 secured to a supporting member 14 by means of screws 15. The carrier 13 is rotatable in the member 14 and is held against endwise movement by means of a dog point screw 16. The carrier has a segment gear 17 attached thereto which is engaged by a gear 18 keyed to a shaft 19 extending through the member 14. A handle 20 secured to the shaft has a spring detent 21 for engaging a serrated rack 22.

Mounted in the carrier 13 are a pair of shafts 25 and 26. The shaft 25 is suitably driven through a coupling 27 from a power supply, while the shaft 26 receives its rotation from the shaft 25 through the medium of the gears 28 and 29.

Mounted on the forward end of the shaft 25 is a cam member 30 provided with a cam groove 31. A guide member 32 is pivoted on the shaft 25 and extends forward having a pin guide 33 for engaging an off center pin 34 extending from the shaft 26. A claw member 35 has a pin 36 riding in the cam groove and reciprocates in a confined channel in the guide member being moved up and down by means of the off center pin 33 and forward and backward by means of the cam groove propelling the pin 36. The gearing arrangement between the gears 28 and 29 is three to one causing the jaws to be extended on every third down movement creating a very fast pull-down, and by moving the lever 20 the film can be framed in the gate. This movement of the lever 20 rotates the carrier 13 for raising or lowering the end of the claw member.

Having thus fully described my invention, what I claim as new and desire to secure by Letters Patent is:

In a motion picture projector, an intermittent feed mechanism comprising a frame, a carrier rotatable in said frame, means extending through said frame for rotating said carrier, a pair of shafts extending through said carrier, a cam on one of said shafts, a guide member pivoted on said shaft, an off-center pin on the other shaft having connection with said guide member, and a claw member reciprocating in said guide member and having connection with said cam.

DON CANADY.

REFERENCES CITED

The following references are of record in the file of this patent:

UNITED STATES PATENTS

| Number | Name | Date |
|---|---|---|
| 1,821,930 | Conade | Sept. 8, 1931 |
| 1,940,312 | Lessler | Dec. 19, 1933 |
| 2,382,772 | Canady | Aug. 14 1945 |